United States Patent

[11] 3,621,377

| [72] | Inventor | James Lim |
| | | 801 McKinley Ave., Oakland, Calif. 94610 |
| [21] | Appl. No. | 880,621 |
| [22] | Filed | Nov. 28, 1969 |
| [45] | Patented | Nov. 16, 1971 |

[54] METHOD AND DEVICE FOR INCREASING THE VOLTAGE OF DC ELECTRICITY
6 Claims, 7 Drawing Figs.

[52] U.S. Cl. ...................................................... 323/93,
317/249 R, 317/250
[51] Int. Cl. ........................................................ G05f 1/50
[50] Field of Search ............................................ 322/2;
310/4; 317/249, 250; 323/93

[56] References Cited
UNITED STATES PATENTS
2,965,836  12/1960  Robinson ..................... 317/250 X
3,184,693  5/1965   Lanctot ........................ 317/249 X
3,249,832  5/1966   Kiyoshi Inoue ............... 317/249 X
3,284,693  11/1966  Lim .............................. 322/2

Primary Examiner—T. E. Lynch
Assistant Examiner—H. Huberfeld
Attorney—George B. White ABSTRACT: A pair of opposed spaced electrodes and dielectric medium between the electrodes, and means for changing the dielectric constant of the dielectric medium so as to vary the electrical capacitance of the electrodes with the changing of the dielectric constant. The electrodes are charged when the dielectric constant of the dielectric medium is high and discharged when the dielectric constant of the dielectric medium is low. The discharge voltage is increased by a factor proportional to the ratio of the capacitance during charging and the capacitance during discharging.

PATENTED NOV 16 1971 3,621,377
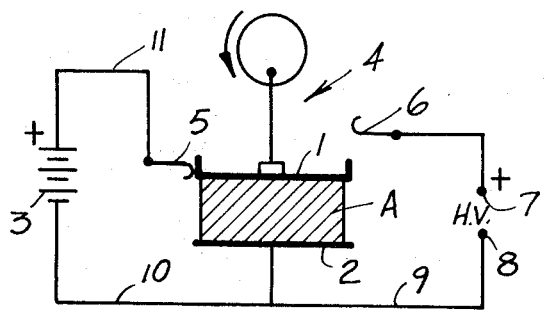
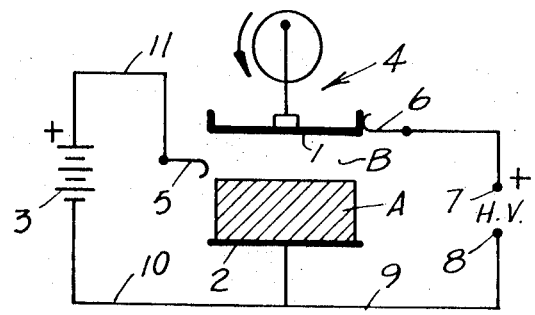
Fig. 1.    Fig. 2.
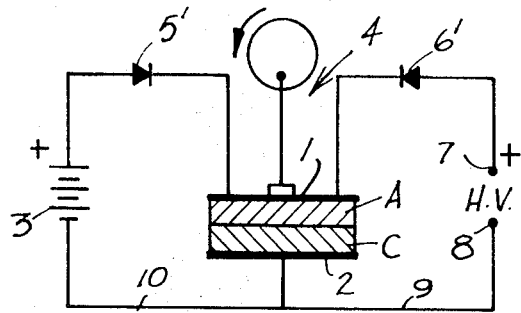
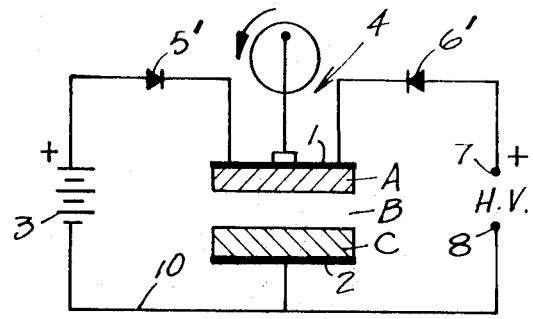
Fig. 3.    Fig. 4.
Fig. 6.
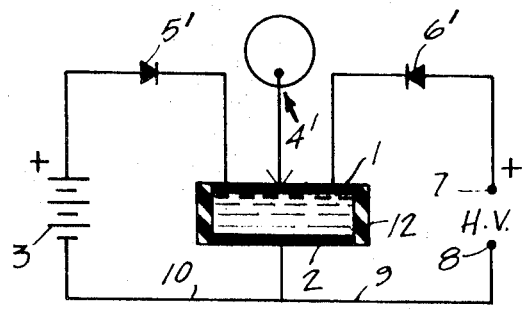
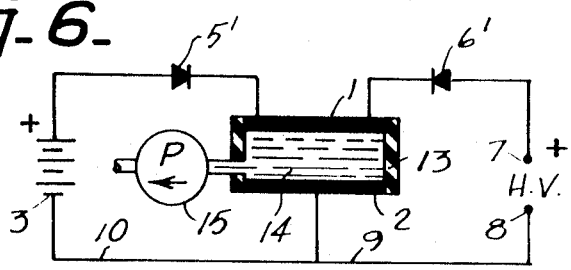
Fig. 5.
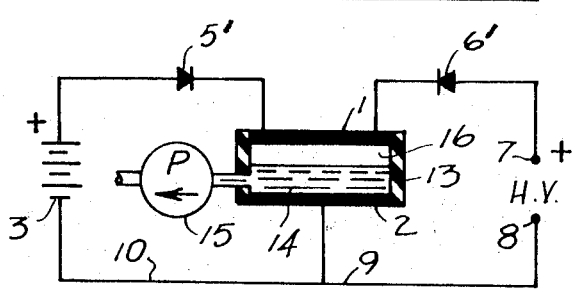
Fig. 7.
INVENTOR.
JAMES LIM
BY
George F. White
ATTORNEY

METHOD AND DEVICE FOR INCREASING THE VOLTAGE OF DC ELECTRICITY

BACKGROUND OF THE INVENTION

There are several prior devices of variable capacitance electrostatic generators which utilize the same basic principle described in U.S. Pat. No. 3,412,318 granted to Robinson, et al., on Nov. 19, 1968; No. 3,107,326 granted to Denholm Oct. 15, 1963; No. 3,094,653 granted to LeMay et al., on June 18, 1963 and No. 3,013,201 granted to Goldie on Dec. 12, 1961. U.S. Pat. No. 3,284,693 granted to James Lim on Nov. 8, 1966, relies on rotation of sets of electrodes to align respectively with an area of high dielectric constant and an area of low dielectric constant. The more or less common principle in the prior art is that if a variable capacitor is charged with a direct current voltage at a relatively high capacitance, and if such charged variable capacitor is varied to a relatively low capacitance and discharged the discharge voltage will be higher than the charging voltage by the ratio of the capacitance at charging to the capacitance at discharging. In U.S. Pat. No. 2,676,273 granted to Oestreicher on Apr. 20, 1954, a vibrator beats a piezoelectric crystal to generate electricity but is not to function as a transformer to increase the voltage of input direct current electricity.

The present invention is an improvement on the prior methods and devices in that it incorporates a dielectric medium with a single predetermined dielectric constant higher than that of a vacuum or a gas to be varied in such a manner as to improve overall efficiency of the increase beyond the capability of the previous methods and devices.

DESCRIPTION OF FIGURES

FIG. 1 is a diagrammatic view of the device with the opposite electrodes in contact with the dielectric.

FIG. 2 is a diagrammatic view of the device of FIG. 1 showing the upper electrode spaced from the dielectric.

FIG. 3 is a diagrammatic view of two sections of the dielectric in contact.

FIG. 4 is a diagrammatic view of the device of FIG. 3 showing the dielectric sections spaced apart.

FIG. 5 is a diagrammatic view of the electrodes in contact with the piezopermittivity dielectric.

FIG. 6 is a diagrammatic view of the device with a dielectric and means to reduce the thickness of the dielectric.

FIG. 7 is a diagrammatic view of the device of FIG. 6 showing the thickness of the dielectric reduced.

DETAILED DESCRIPTION

In the device described in FIGS. 1 and 2, opposed and spaced electrodes 1 and 2 are on the opposite faces of a dielectric A stationary between the electrodes 1 and 2.

In this diagrammatic illustration the electrodes 1 and 2 are charged by a battery 3. A reciprocating motor 4 is connected to electrode 1 to move it up and down as the motor reciprocates. A mechanical contactor or brush 5 forms an electric contact with the electrode 1 so as to connect only during the charging operation, namely while the electrode 1 is on the face of the dielectric A. Another contactor or brush 6 is spaced above the top face of the dielectric A so as to contact the electrode 1 when it is lifted into the position shown in FIG. 2 during discharging. These contactors 5 and 6 may be replaced by a brushless circuit employing electronic diodes. the discharging contactor 6 is connected to a high voltage output terminal 7. The other high voltage output terminal 8 is connected by a line 9 to the other electrode 2. One terminal of the battery 3 is connected by a line 10 to the electrode 2 and the other battery terminal by a line 11 to the input contactor 5.

When the motor 4 lifts the electrode 1 so as to disconnect it from the brush 5 and connect it to the contactor 6, as shown in FIG. 2, then the space between the electrode 1 and the top face of the dielectric A contains a dielectric B, such as air, which has a dielectric constant substantially lower than that of the dielectric A and this results in a combined dielectric constant lower than that of the first dielectric A.

The combined dielectric constant may be determined by the following formula derived from the basic principles of electrostatics:

$$1/k = 1/Tk_1 + 2/T^*2 + 3/Tk_3$$

where $k$ = combined or overall dielectric constant
$k_1$ = dielectric constant of material A
$t_1$ = thickness of material A
$T$ = combined or overall thickness of all the dielectric materials, i.e. $T = t_1 + t_2 +$
$k_2$ = dielectric constant of material B
$t_2$ = thickness of material B
$k_3$ = and $t_3$ = dielectric constant and thickness of material C.

In the form shown in FIGS. 3 and 4 there are initially two dielectrics, A and C and the reciprocating motor 4 reciprocates dielectric A so as to space it apart from dielectric C. Then dielectric B, the medium filling the space between the dielectrics A and C, reduces the dielectric constant of the entire unit to operate in the manner described in the form of FIGS. 1 and 2. In this instance, in place of the brushes or switches 5 and 6, suitable diodes 5' and 6' are provided. Diode 5' allows current only during charging, and diode 6' only when the desired discharge voltage is reached. In the forms shown in FIGS. 1 to 4 there is also a reduction in capacitance due to the increased spacing between the electrodes during discharge, but this reduction is minor compared to the large reduction caused by the lowered dielectric constant at discharge when high permittivity dielectrics are employed. Also in the forms shown in FIGS. 1 to 4, the separable sections need not physically contact during charging. The very narrow gap thus remaining correspondingly dilutes the charging dielectric constant.

In the form shown in FIG. 5 the dielectric material is of the kind which has piezopermittivity properties and a variable mechanical pressure generator 4', such as a reciprocated pressure element, is provided to vary the dielectric constant to increase the input voltage from the battery or a source of direct current electricity.

A piezopermittivity material is a dielectric material the dielectric constant of which changes when a mechanical stress or pressure is applied to the material. As an example, the piezopermittivity dielectric may be liquid chlorinated diphenyl contained between the electroces 1 and 2 in a suitable insulated fluid container 12, the top and bottom of which form the electrodes. The top electrode is resiliently flexible to transmit pressure.

In all the above forms multiple devices may be coupled together in series to produce still higher voltage.

As an illustration, in connection with the forms shown in FIG. 1 to 4 inclusive, the dielectric A and C may be a high permittivity ceramic made from titanate and zirconate compounds having a dielectric constant of 2000.

If the device shown in FIGS. 1 and 2 is operated in a high vacuum the dielectric B is a vacuum having a dielectric constant of 1.0. The thickness of dielectric A is 1 inch and the thickness of dielectric B at the time of discharge is 0.01 inch. From the aforementioned formula it is calculated that the dielectric constant of the combined dielectrics A and B is about 96.2. Thus the discharge voltage will be increased to about 21 times the charging voltage. An advantage of the use of the vacuum in this form is that much of the electrical stress of the discharge potential between the electrodes will be sustained by the vacuum, and a high vacuum has a very high dielectric strength.

Also, as can be seen from the aforementioned formula, when the dielectric constant of dielectric A is very high and the dielectric constant of dielectric B is very low, only a small fraction of dielectric B is needed to dilute dielectric A to accomplish a lower combined dielectric constant.

In the form shown in FIGS. 6 and 7 an insulated container 13 is filled with a liquid dielectric 14 and is connected to a reversible pump 15. The top and bottom of the container are conductors to form the electrodes 1 and 2 in the same kind of circuit as shown in FIGS. 3 and 4.

In order to change the dielectric constant between the electrodes 1 and 2 some of the liquid dielectric 14 is pumped out by the pump 15 creating a space 16 between the top electrode 1 and the level of the liquid dielectric 14. The vacuum or gaseous substance in said space 16 then functions as the second dielectric B. The liquid 14 functions as the first dielectric A. By reversing the pump the space 16 can be alternately filled and emptied as required.

I claim:

1. In a device for increasing the voltage of a direct current voltage source,
   - a set of spaced electrodes of constant effective surface area, said electrodes having alternative positive and negative polarities,
   - a first dielectric medium of a single predetermined constant between said set of electrodes,
   - a second dielectric medium of lower dielectric constant than that of said first dielectric medium being capable of combining with said first dielectric medium so that the combined dielectric media have a lower dielectric constant than that of said first dielectric medium,
   - means to impart a charge of direct current electricity to said electrodes when said first dielectric medium is the only medium between said electrodes,
   - and means to discharge said pair of electrodes when said dielectric media are combined,
   - and means intermittently to combine said dielectric media for alternately lowering and increasing the dielectric constant between said electrodes respectively during discharging and charging.

2. The invention defined in claim 1 and
   - a dielectric having a dielectric constant lower than said predetermined dielectric constant,
   - means to introduce the dielectric of lower dielectric constant intermittently between said spaced set of electrodes and said dielectric medium of predetermined dielectric constant while said dielectric medium remains between said electrodes,
   - said charging means to charge said pair of electrodes with direct current voltage from said direct current voltage source when said dielectric medium of predetermined dielectric constant is between said pair of electrodes, and
   - said discharge means operating when said dielectric of lower dielectric constant is between said pair of electrodes.

3. The invention defined in claim 1, and
   - said first dielectric medium including,
   - separable sections of dielectrics having high dielectric constants movable apart by the respective electrodes, and
   - said second dielectric medium being of low dielectric constant and being capable of occupying the space between the sections when they are moved apart, thereby to lower the overall dielectric constant of the combined dielectrics between said pair of electrodes.

4. The invention defined in claim 1, and
   - one of said electrodes being movable away from said first dielectric medium thereby to create a space between said movable electrode and said first dielectric medium and admitting said second dielectric medium of low dielectric constant in the space between the movable electrode and the first dielectric medium and thereby to lower the overall dielectric constant of the combined dielectrics between the pair of electrodes,
   - means to connect said movable electrode to said charging means in its initial position, and
   - means to connect said movable electrode to said discharging means when the electrode is spaced from said dielectric of high dielectric constant.

5. The invention defined in claim 1, and
   - said first dielectric medium being capable of having its thickness decreased to be spaced from one of the electrodes for admitting said second dielectric medium thereby to lower the overall dielectric constant between said electrodes,
   - and means alternately to decrease and increase the thickness of said dielectric medium between said electrodes respectively during discharging and charging.

6. The invention defined in claim 1, and
   - said first dielectric medium being a liquid dielectric in an insulating container,
   - said electrodes being formed by spaced conductor sides of said container,
   - and means to alternately withdraw liquid from said container and refill said container for alternately creating a space between one of said electrodes and said liquid respectively admitting said second dielectric medium for decreasing the dielectric constant between said electrodes during said discharging and expelling said second dielectric medium for increasing the dielectric constant between said electrodes during charging.

* * * * *